United States Patent

[11] 3,617,835

[72] Inventors Stephen T. Dreher
Cornwells Heights, Pa.;
John W. Marchetti, Cherry Hill, N.J.; Gary
H. Stock, Fairless Hills, Pa.
[21] Appl. No. 861,667
[22] Filed Sept. 29, 1969
[45] Patented Nov. 2, 1971
[73] Assignee The Budd Company
Philadelphia, Pa.

[54] OPERATING MEANS FOR RECIPROCATING MECHANISM
6 Claims, 3 Drawing Figs.
[52] U.S. Cl. .................................................. 318/266,
318/285, 318/466
[51] Int. Cl. .................................................. H02p 3/00
[50] Field of Search........................................... 318/265,
266, 300, 461, 463, 464, 466, 285

[56] References Cited
UNITED STATES PATENTS
| | | | |
|---|---|---|---|
| 2,571,982 | 10/1951 | Winchester et al. .......... | 318/461 |
| 3,177,417 | 4/1965 | Wright ........................ | 318/331 |
| 3,199,857 | 8/1965 | Klamp ......................... | 318/266 |
| 3,247,615 | 4/1966 | Kalog .......................... | 318/283 |
| 3,513,374 | 5/1970 | Koment ....................... | 318/266 |
| 3,143,696 | 8/1964 | Harris .......................... | 318/266 |
| 3,221,234 | 11/1965 | Ault ............................. | 318/331 |

Primary Examiner—Benjamin Dobeck
Assistant Examiner—K. L. Crosson
Attorneys—Thomas I. Davenport, Edward M. Farrell and William R. Nolte ABSTRACT: A bidirectional motor includes armature and field windings. A switching circuit connects power to drive the motor in a first direction. A detector is responsive to a decrease in the current flow in the armature winding to stop the motor and then switch the switching circuit to apply the power to drive the motor in a second direction.

PATENTED NOV 2 1971

3,617,835

INVENTORS
STEPHEN T. DREHER
JOHN W. MARCHETTI
GARY H. STOCK

BY *Edward M. Farrell*

ATTORNEY

OPERATING MEANS FOR RECIPROCATING MECHANISM

Various means have been employed in the past for cycling a reciprocating mechanism between predetermined normal and temporary positions. For example, bidirectional motors have been employed to drive a mechanism in a first direction for a predetermined distance. At the desired time, the current through the motor is reversed to cause the mechanism to be moved in the opposite direction. L While such reciprocating mechanisms may take a wide variety of forms, the subject invention will be described in connection with a door on a train. In the embodiment described, the door may be between two cars and adapted to be opened to permit a passenger to pass therethrough. Upon operation of a switching device, the door will automatically open to permit the passenger to pass therethrough. At the end of a predetermined time period, the door will automatically close.

In the past, various microswitches have been employed to control the operation of reciprocating mechanisms, such as train doors. Upon approaching various limits of movements the door may cause a braking circuit to slow down the motor moving the door. Upon reaching the limits of movement, the door may be made to open a microswitch to shut off the motor. Problems encountered in the systems mentioned have included the requirement of precise and periodic adjustments of the mechanical parts associated with the stop members, troubles with the parts actuating the microswitches as well as with the microswitches themselves and inability of the motors to handle abnormal conditions as when obstacles are encountered during door movement. In the latter cases, despite the obstacle in the way of the door, the motor continues to run to cause undesirable heating of the motor leading to possible breakdown of the overall system.

It is an object of this invention to provide a novel circuit for controlling the operation of a bidirectional motor.

It is a further object of this invention to provide an improved circuit for driving a bidirectional motor through one complete cycle with the motor moving in two directions within a predetermined time period during the cycle.

It is still a further object of this invention to provide an improved circuit for controlling the opening and closing of a train door.

It is still a further object of this invention to provide an improved circuit for controlling the opening and closing of a train door without the need for microswitches or mechanical stop members.

It is still a further object of this invention to provide an improved circuit for controlling the opening and closing of a train door having improved safety means provided to stop the motor closing the door when an obstacle is encountered by the door.

In accordance with the present invention, a bidirectional motor is driven by current applied through a switching circuit. The motor is driven in a first direction by current supplied through a zener diode biased to break down when the back e.m.f. voltage developed across the armature winding of the motor exceeds a predetermined level. The back e.m.f. voltage across the armature drops when the motor is slowed down as a result of an obstacle thereby causing the zener diode to become nonconducting and the motor to stop. After a predetermined time period, the switching circuit is switched to apply current to the motor to drive it in the opposite direction. Again the current through the zener diode keeps the motor running until an obstacle or stop member is reached at which point the zener diode again becomes nonconducting to stop the motor.

Other objects and advantages of the present invention will be apparent and suggest themselves to those skilled in the art, from a reading of the following specification and claims, in conjunction with the accompanying drawings, in which:

Figure 1:
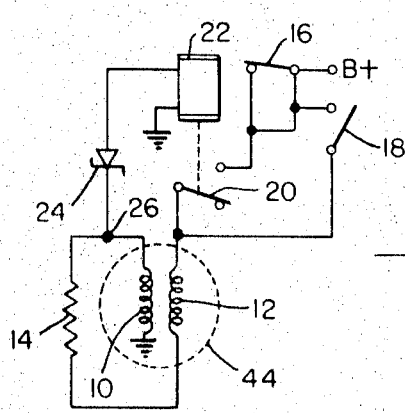
FIG. 1 is a schematic circuit illustrating the basic concept involved in the present invention.

Referring particularly to FIG. 1, the basic concept underlying the invention is illustrated. A DC motor 44 comprises an armature winding 10 and a field windings 12. A resistor 14 is interposed between the windings. During operation, a source of power, designated as B+, is connected across the windings 10 and 12 and resistor 14 to a point of reference potential, designated as ground.

A switch 16 is a normally closed line switch during operation which may be opened to disable the motor and control circuit, if required. A switch 18 is a normally open momentary contact of a well-known type. When the switch 18 is closed and released manually, it will open again. A switch 20 is a normally opened relay switch. When the switch 20 is closed, power is applied to a relay 22 through a zener diode 24.

When the switch 18 is closed, current is applied to the windings 10 and 12 of the motor and resistor 14. The winding 10 generates a back e.m.f. voltage during movement of the motor at point 26. The generation of a back e.m.f. during operation of a DC motor is well known to those skilled in the art.

The Zener diode 24 is normally nonconducting and is adapted to break down when the back e.m.f. voltage generated across the winding 10 exceeds a predetermined value. When the zener diode 24 breaks down, current flows therethrough and through the relay 22 thereby causing the switch 20 to close.

The switch 20 operates as a holding contact after it is closed, with current flowing through the switch 20, the winding 12, the resistor 14, the zener diode 24 and the relay 22. The switch 20 is maintained closed as long as current flow through the relay 22.

In contrast with a conventional diode, as is well known, the zener diode is capable of passing large reverse current nearly independent of voltage when a characteristic breakdown potential has been exceeded in the reverse direction. In the embodiment illustrated, the component values are chosen so that the potential across the zener diode 24 is below the breakdown threshold when the controlled motor is stalled and above that threshold when the motor is operating at normal speed. Such a potential variation with respect to ground will occur at junction 26 depending upon the speed-related back e.m.f. generated by the armature winding 10. This will be high at operating speeds and low or zero as the motor is slowed down or stalled.

After the motor has started, the switch 18 is returned to its normally opened condition. Any stalling effect on the motor resulting in reduction of the back e.m.f. generated by the armature 10 at the point 26 to a value below the zener diode reverse current threshold will interrupt the holding current through the relay 22. When this holding current is interrupted, the switch 20 will open and the motor circuit will be interrupted. In the embodiments illustrated in FIGS. 2 and 3, in addition to the concept described in FIG. 1, means for providing that the motor reverse direction after a predetermined time period will be described.

Figure 2:
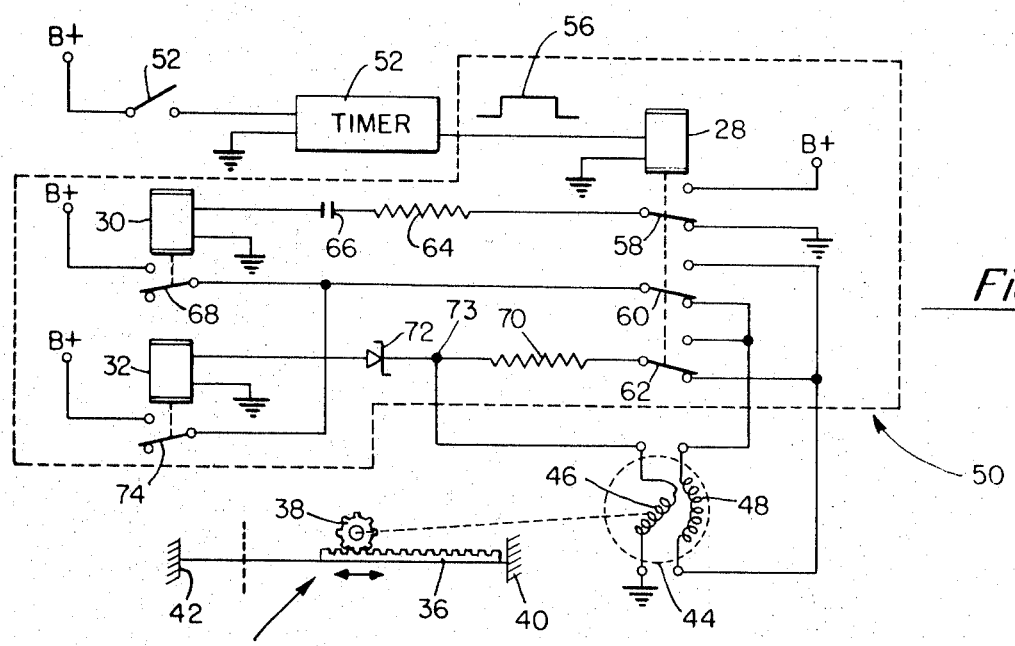
FIG. 2 is a schematic diagram illustrating one embodiment of the present invention.

Referring particularly to FIG. 2, the subject invention will be described in connection with electrical means for cycling a reciprocating mechanism between predetermined normal and temporary positions with accommodation for random obstructions between these positions. Such a situation, for example, could be a door in a train. When a person is desirous of passing from one train to another he normally could operate a switch to cause the door to open. After passing through the door, and after a predetermined time period, the door will automatically close. In some cases, the passenger or other object may prevent the door from opening or closing normally. In situations, such as these, means are provided to assure that a complete cycle is initiated without causing damage to the motor or passenger involved.

Referring particularly to FIG. 2, a circuit for operating a reciprocal mechanism is illustrated. Basically, the circuit includes three relays 28, 30 and 32 adapted to be operated sequentially. The operation of the relays at predetermined times controls the operation of the reciprocal mechanism 34. This reciprocal mechanism may be connected to drive a train door.

The reciprocal mechanism comprises a rack 36 connected to be rotated by a pinion 38. The rack is reciprocated between a normally retracted position defined by a first stop member 40 and an extended position defined by a second stop member 42. The motor 44 is connected to drive the pinion 38 as indicated by the dotted line between the motor and the pinion 38.

The motor 44 includes an armature winding 46 and a field winding 48. As will be described, the current through the field winding 48 may be reversed so that the motor 44 is capable of driving the pinion 38 in either of two directions.

The motor 44 is shunt wound having its windings connected so as to provide constant speed. It was found that a constant speed motor has advantages in a train door system over a series motor because the latter has maximum torque at low speed and infinite speed at zero torque. This means that if a door on a train becomes bound and suddenly released, the door would normally be moving too fast so that as it hits the stop members it will develop its maximum torque. Heretofore, to get around such high speeds, braking resistors were switched into the driving circuit as the door reached its limits to slow down the door. The subject invention provides a constant speed motor regardless of mechanical loading. Therefore, the mechanical energy in a door which must be absorbed by stops or microswitches may be held within bounds without the use of braking resistors and their attendant microswitches. Such shunt motors used for constant speed are well known to those skilled in the art.

The motor 44 is controlled by a control circuit 50, which include the relays 28, 30 and 32 and their associated contacts. The source of operating potential is generally designated as B+.

In considering the operation, first assume that the Lrack 36 is at its normal retracted position in contact with the stop member 40. In this case, all the relay arms and associated contacts will be in the positions illustrated in FIG. 2.

To start the operation, a switch 52 is closed to cause B+ to be applied to a timer circuit 54. The output signal from the timer circuit 54 may be of variable duration and is illustrated by the signal wave form 56. The output signal from the timer 54 is of sufficient amplitude to apply current through the relay 28 for a predetermined time period dependent upon the width of the signal. Operation of the relay 28 causes contact arms 58, 60 and 62 to move away from the bottom contacts and to electrically engage the upper contacts of the relay.

When the relay 28 is operated, B+ is applied through the contact arm 58, a resistor 64, a capacitor 66 to the relay 30, causing the relay 30 to become operative to raise the contact arm 68 from its lower to its upper contact. The component values of the resistor 64 and the capacitor 66 are chosen so that sufficient current flow through the coil of the relay 30 to operate the relay during a preselected portion of the capacitor charging cycle. After the capacitor 66 has been charged, no current will flow through the relay 30.

When the relay 30 is operated to lift the arm 68, B+ is applied through the contact arm 68, the contact arm 60, the upper contact associated with the arm 60, through the field winding 48, through the raised contact arm 62, through a resistor 70, and through the armature winding 46 of the motor. With the current applied to the armature and field windings of the motor 44, the motor becomes operative to drive the pinion 38 thereby causing the rack 36 to be moved toward the left.

Connected in parallel with the armature winding 46 is a circuit including a zener diode 72 and the relay 32. The component values of this latter circuit are chosen so that current flow through the coil of the relay 32 during normal operation of the motor 44 is sufficient to cause the contact arm 74 to be lifted from the lower to the upper contact of the relay 32. When this happens, B+ is applied; through the contact arm 74, through the raised contact arm 60, through winding 48, through contact arm 62, through resistor 70 and through the winding 46. This current flow through the windings 46 and 48 continues to activate the motor 44. In the meantime, the relay 30 becomes inoperative as a result of the capacitor 66 becoming fully charged and no current flow in the circuit. The contact arm 68 drops to its lower contact with no current through the relay 30. Thus it is seen that the relay 30 is used to apply the initial current to start the motor and the relay 32 is used to provide the current to continue the operation of the motor.

The motor 44 may be considered as operating in its forward mode with the pinion 38 being rotated in a clockwise direction. Normal forward operation will continue with the rack 36 being moved towards its extended position until the rack encounters some obstruction or the stop member 42. In operation, the duration of the signal 56 to operate the relay 28 is chosen to be longer than the time required for normal travel of the rack 36 from its initial position to the stop member 42.

The zener diode 72 is normally nonconducting and is adapted to be broken down by the back e.m.f. at point 73 generated by the armature winding 46. As long as the motor 44 is operating normally, the back e.m.f. generated will be sufficient to break down the zener diode 72 to permit the relay 32 to remain operative. Once the back e.m.f. voltage generated by the armature winding 46 drops below a certain level, however, as a result of a slowing down or stalling of the motor, the zener diode 72 becomes nonconducting and the relay 32 becomes inoperative causing the contact arm 74 to drop.

As the rack 36 encounters the stop member 42, or any other obstacle in its path of travel, the motor 44 becomes stalled reducing the normal back e.m.f. generated by the winding 46. As a result of the operation of the relay 32, the source of power is disconnected because the arm 74 is dropped to its lower position. At this time, the rack 36 will remain in its extended position for the remainder of the duration of the signal 56. At the expiration of the time of the signal 56, the current in the relay 28 will be discontinued and the second part of the reciprocating movement takes places, as will be described.

When the relay 28 becomes inoperative, the contact arms 58, 60 and 62 drop to their lower positions, as illustrated in the FIG. 2. At this time, the capacitor 66 having built up a charge, will now discharge through the resistor 64 and the contact arm 58 to ground. As a result of the discharge current through the capacitor 66, the relay 30 will again become operative for a short period of time to cause the contact arm 68 to rise to engage its upper contact.

With the contact arms 58, 60 and 62 returned to their lower positions, the current applied to the field winding 48 will be reversed to cause the motor 44 to move the pinion 38 in the opposite direction. B+ is applied through the raised contact arm 68, through the lowered contact arm 60, through the field winding 48, through the lowered contact arm 62, through the resistor 70 and finally through the winding 46. Again a back e.m.f. is generated by the winding 46 at point 73 to break down the zener diode 72.

When the zener diode 72 is conducting, the relay 32 becomes operative to lift the contact arm 74. B+ is then applied through the raised contact arm 74, the lowered contact arm 60, the winding 48, the lowered contact arm 62, the resistor 70 and finally the winding 46.

The motor 44, now moving in its opposite direction moves the pinion 38 in a counterclockwise direction to cause the rack 36 to be moved toward the right. The movement of the rack 36 continues until an obstruction or the stop member 40 is reached. When an obstruction or the stop member 40 is reached, the back e.m.f. generated by the armature winding 46 drops because of the slowing down or stalling of the motor and the zener diode 72 becomes nonconducting.

With the zener diode 72 nonconducting, the relay 32 becomes inoperative causing the contact arm 74 to drop to its lower contact. At this point a complete cycle has been completed and all components will have been returned to their normal position as shown in FIG. 2.

It should be understood that an end point of the extending and of the retracting modes of the cycle explained above will be determined by any obstruction in the path of the reciprocating rack 36. The control system including the control circuit 50 incorporates protective features for the motor, the mechanical linkages and for objects which may obstruct the movement of the rack 36 or of the means driven by the pinion 38, such as a train door.

It is noted that if the subject device is used in connection with a train door, that if the rack 36 is stopped by a passenger passing therethrough, for example, the mechanism will discontinue moving until the next pulse, such as the signal 56 is applied to the system. When the next pulse 56 is applied to the system, the rack 36 will move toward the left with the reciprocating operation being that as described. It is noted that the switch 52 may be associated with the door of a train and could be operated by a passenger to start the pulse 56 immediately.

Figure 3:
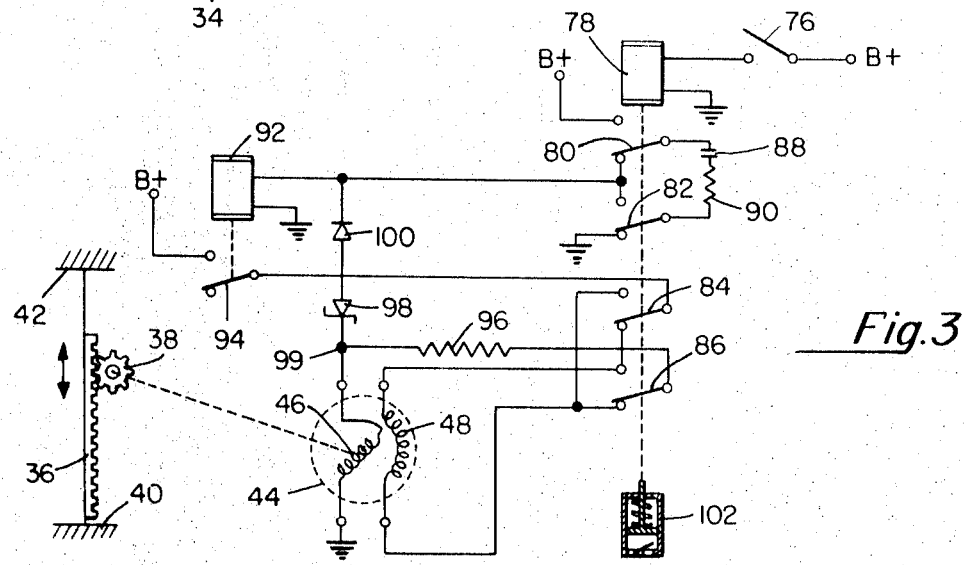
FIG. 3 is a schematic diagram illustrating another embodiment of the present invention.

Referring particularly to FIG. 3, a different form of control circuit is illustrated. In this case, the motor 44 is adapted to drive the pinion 38 to move the rack 36 from stop position 40 to stop position 42 and back again. A cycle is initiated by the closing of a momentary switch 76; which connects the source of power B+ to actuate a relay 78. Prior to actuation, the contact arms 80, 82, 84 and 86 of the relay 78 are in the down positions as indicated. Upon actuation of the relay 78 the contact arms will move to the up positions.

With the relay 78 operated to lift the contact arms 80 and 82, B+ is applied through the contact arm 80, to a capacitor-resistor circuit including a capacitor 88 and a resistor 90, through the raised contact arm 82 and to a relay 92.

Current through the relay 92 causes the contact arm 94 to rise permitting the source of power B+ to be applied through the raised contact arm 94, through raised contact arm 84, through winding 48, through raised contact arm 86, through a resistor 96 and the winding 46. As previously described, the armature winding 46 builds up a back e.m.f. voltage at point 99 when the motor 44 is in operation. This causes a breakdown of the zener diode 98 to permit current to pass from point 99, through the zener diode 98, diode 100 and the relay 92. The conventional diode 100 prevents shunting of the capacitor charging current so that current through the coil of the relay 92 is sufficient for the contact arm 94 to be picked up.

As in the previous embodiment described in connection with FIG. 2, the rack 36 will continue to move upwardly until an obstacle or the stop member 42 is encountered. Upon encountering an obstacle or the stop member 42, the motor 44 is stalled. The back e.m.f. voltage at point 99 drops causing the zener diode 98 to become conducting. At this point the relay 92 becomes inoperative.

In this embodiment, a dashpot 102 is provided to produce the time delay instead of the signal 56 as described in connection with FIG. 2. The dash pot 102 maintains the contact arms 80, 82, 84 and 86 in their up positions for a predetermined time. Controlled air leakage is attained from the dashpot 102 and after a predetermined time period, the contact arms 80, 82, 84 and 86 will drop to their lower positions as illustrated in FIG. 3.

At this point, the capacitor 88 discharges through the coil of the relay 92 thereby again causing the contact arm 94 to be picked up again. B+ is connected through the raised contact arm 94, through the lowered contact arm 84, through the winding 48, through the lower contact arm 86, through the resistor 96 and finally through the winding 46. Again, the back e.m.f. generated by the armature winding 46 at point 99 causes the zener diode 98 to break down, permitting current to pass through the zener diode 98, diode 100 and relay 92.

The motor 44, now moving in its opposite direction, causes the pinion 38 to be rotated in a counterclockwise direction causing the rack 36 to be moved downwardly. The rack 36 continues to be moved downwardly until an obstacle or a stop member 40 is reached. Upon reaching the stop member 40 or an obstruction, the motor 44 is stalled and the current through the windings of the motor is interrupted. At this time, all the components illustrated in FIG. 3 will have returned to their initial conditions.

In order to start the next cycle of operation, the momentary switch 76 must be again operated. This momentary switch may be associated with the train door and easily accessible to a passenger who may be between the door and the stop member.

It is thus seen that the present invention has provided a relatively simple circuit to operate a reciprocating mechanism. This is accomplished without the need for complicated microswitch circuitry or other mechanical parts. In addition, the constant speed motor provided eliminates the necessity of braking resistors as the reciprocating mechanism moved close to the stop members.

While the subject invention has been described generally in a connection with a train door, it is apparent that the invention may be used in many other types of devices involving reciprocal movement. Some such devices, for example, could include the operation of garage doors, the operation of radar antenna systems, and various other devices.

What is claimed is:

1. In combination with a bidirectional motor having armature and field windings, a source of power for driving said motor, a switching circuit for applying current from said source of power to said armature and field windings to drive said motor in a first or second direction, said switching circuit including first and second switches, said second switch having first and second operating conditions, a first relay operative to close said first switch to connect said source of power through said second switch to drive said motor in a first direction when said second switch is in a first operating condition, a zener diode responsive to a back e.m.f. generated in said armature winding to control the operation of said first relay to disconnect or connect said source of power to stop or start said motor, said zener diode being conductive to actuate said first relay when said motor is moving at a predetermined speed to generate a counter e.m.f. of a predetermined amplitude, said zener diode becoming nonconductive to maintain said first relay unactuated and cause said motor to stop when said motor starts to move below said predetermined speed to generate a counter e.m.f. below said predetermined amplitude, and a second relay to switch said second switch from said first to said second operating condition and to reactuate said first relay to switch the direction of current from said source of power to said field winding to drive said motor in a second direction after a predetermined time period.

2. The invention as set forth in claim 1 wherein a second switching circuit is provided to initiate the current flow from said source of power through said armature and field windings to start said motor.

3. The invention as set forth in claim 2 wherein said second switching circuit comprises a third relay for actuating a switch to connect said source of power to initiate said current flow, means for actuating said third relay, said last-named means including a charging and discharging circuit, said last-mentioned circuit becoming charged when said second relay is operative to connect said source of power thereto and becoming discharged when said second relay is inoperative to disconnect said source of power therefrom said third relay becoming operative during the time that said circuit is charging or discharging.

4. The invention as set forth in claim 3 wherein a timer circuit is provided to control the time duration of the operation of said second relay.

5. The invention as set forth in claim 4 wherein said motor drives a reciprocating mechanism.

6. The invention as set forth in claim 5 wherein said reciprocating mechanism includes a train door.

* * * * *